United States Patent [19]

Chiodo

[11] Patent Number: 5,253,791
[45] Date of Patent: Oct. 19, 1993

[54] RACK FOR CARRYING ARTICLES ON A SEAT OF A VEHICLE

[76] Inventor: John A. Chiodo, 15944 Chilmsford, Mt. Clemens, Mich. 48044

[21] Appl. No.: 852,016

[22] Filed: Mar. 16, 1992

[51] Int. Cl.⁵ .............................................. B60R 7/04
[52] U.S. Cl. ........................ 224/275; 296/37.15; 211/135
[58] Field of Search ............... 224/273, 275, 42.43, 224/42.44, 42.42; 296/37.15, 37.1; 211/126, 135, 128; 206/562, 557; 229/904; 297/135, 188; 108/42, 44, 43, 135

[56] References Cited

U.S. PATENT DOCUMENTS

| | | | |
|---|---|---|---|
| 2,584,006 | 1/1952 | Finger | 224/275 X |
| 2,875,940 | 3/1959 | Dunn | 224/275 X |
| 3,326,445 | 6/1967 | Goings | 108/44 X |
| 3,828,994 | 8/1974 | Hollins | 224/27.5 |
| 4,813,751 | 3/1989 | Fenn | 108/44 X |
| 4,832,241 | 5/1989 | Radcliffe | 108/44 X |
| 4,938,401 | 7/1990 | Weisbrodt et al. | 224/275 |
| 4,946,120 | 8/1990 | Hatcher | 224/275 X |
| 4,949,890 | 8/1990 | Schultz | 224/275 |
| 5,102,080 | 4/1992 | Altieri | 224/275 X |

Primary Examiner—Henry J. Recla
Assistant Examiner—Glenn T. Barrett
Attorney, Agent, or Firm—Gifford, Groh, Sprinkle, Patmore and Anderson

[57] ABSTRACT

A rack for supporting goods, such as hot food, on the seat of a car during delivery includes a platform having a leg extending in one direction at one side, and a second leg extending in an opposite direction from an opposite side. The first leg acts as a edge or rail to catch the object on the support surface of the platform and the second leg extends from the platform to the car seat to maintain the platform on a generally horizontal plane. The first and second legs have differing lengths, so that the rack may be inverted to accommodate different depths of seat crevices. Also disclosed is an extension member for seats having unusually deep crevices.

12 Claims, 1 Drawing Sheet

RACK FOR CARRYING ARTICLES ON A SEAT OF A VEHICLE

BACKGROUND OF THE INVENTION

I. Field of the Invention

The present invention relates to a rack for carrying articles on a seat of a vehicle, and more particularly, the invention relates to a rack which is suitable for transporting food on a horizontal plane on the seat of a vehicle.

II. Description of the Prior Art

It is frequently desirable to carry items which must be maintained on a horizontal plane, such as food or liquid, in vehicles such as automobiles. Typically, these items are carried on the floor because the seats of automobiles generally slope downwardly from front to back. However, the floor of many vehicles or the vertical clearance above the floor is too small to permit transportation of large items such as cakes or pizza boxes. This is particularly a problem in the restaurant business where food is delivered to the home or office. The food delivery is frequently made by delivery persons who utilize their own vehicles. Because food, such as pizza, is hot when it leaves the restaurant, it must be maintained on a generally horizontal plane during delivery or a portion of the food will run or slide during delivery. This results in a product which is unsalable when it arrives at the delivery point.

Trays which are hung on seat backs of automobiles, such as disclosed in U.S. Pat. No. 2,584,006 to Finger, are known. Finger discloses a device having a pair of brackets which extend over the seat back to support a pair of foldable trays. The trays fold down for supporting refreshments.

Likewise, Fenn, U.S. Pat. No. 4,813,751, discloses a vehicle utility console which has a rectangular frame having two separate compartment cavities and an upstanding flange at the rear end of the frame to engage a seat belt and secure the console to a seat. The console is suitable for carrying small items within the cavities.

Hollins, U.S. Pat. No. 3,828,994, discloses a platform which extends slightly into a crevice between the front seat and the front seat back of a vehicle for carrying goods such as grocery bags. A strap is provided which is looped about the passenger head restraint to maintain all but the rear portion of the platform above the front seat so that packages may be placed on the platform without contacting the front seat to effect the motor vehicle ignition starter interlock system.

Goings, U.S. Pat. No. 3,326,445, discloses a car seat tray of the type used in drive-in restaurants and the like for serving food or beverages. The seat tray has a plurality of circular openings for reception of cups and bottles and a rectangular opening for reception of food. A rear wall portion extends downwardly from the rear of the tray to support the tray in a generally horizontal position on the seat.

Racks for supporting objects on seats are also known which have a downward extending L-shaped flange at one side of a support surface. The L-shaped flange has one end portion which extends parallel to the support surface to extend into the crevice of a seat to hold the tray in position.

Thus, it would be desirable to have a simple and inexpensive device for transporting large food items and which is suitable for use in a variety of delivery vehicles having differently shaped seats.

SUMMARY OF THE INVENTION

A delivery rack for transporting objects on the seat of a vehicle is disclosed. The platform has a pair of opposed planar surfaces, one surface resting on a portion of the seat and the opposite surface for supporting items to be transported. A first leg extends upwardly from a front side of the platform and a second leg extends downwardly in an opposite direction from a rear side of the platform. The downwardly extending leg extends to the seat of a vehicle adjacent the seat back into a crevice which is formed at a junction of the seat back and the seat. The other leg extends upwardly adjacent a front portion of a seat to hold objects which are positioned on the other surface of the rack.

The rack may be inverted so that either leg may be used to extend to the seat to level the support surface of the platform. The legs are of differing lengths so that seats having differing slopes may be accommodated with the same rack.

Additionally disclosed is an extension member having a groove to receive one of the legs such that the length of the leg may be extended in the event that the depth of the crevice of the seat is extraordinarily deep.

BRIEF DESCRIPTION OF THE DRAWING

The above and other objects, features and advantages of the invention will become clear from the following description of the preferred embodiments thereof, taken in conjunction with the accompanying drawings, in which.

DESCRIPTION OF THE PREFERRED EMBODIMENTS

Figure 2:
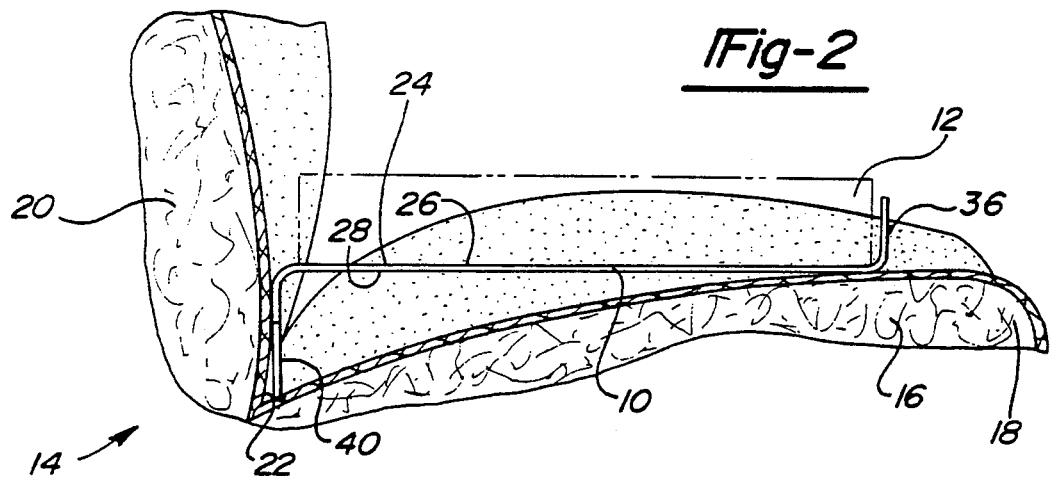
FIG. 2 is a side view of the rack shown in position on the seat of an automobile.

As best shown in FIG. 2, a rack 10 for supporting objects, such as pizza boxes 12, on the seat 14 of a vehicle is thereshown. The seat includes a lower seat 16 which slopes rearwardly from a front 18 to join a seat back 20 at a crevice 22.

The rack 10 includes a platform 24 having a pair of opposed support surfaces 26 and 28. The support surfaces 26 and 28 are generally rectangular shaped having a pair of peripheral edges 30 extending from one side 32 to an opposite side 34. A first leg 36 or flange extends in a direction normal to the support surface 28 at the one side 32 of the platform. The first leg 36 has a free end 38 which is disposed a predetermined distance from the support surface 26. The leg is disposed to hold the object from sliding off the support surface 26 when the vehicle is stopped.

A second leg 40 extends from the support surface 28 in a direction opposite to the direction of the first leg. The second leg 40 has a free end 42 disposed a predetermined distance from the support surface 28. The predetermined distance of the second leg is different than the predetermined length of the first leg 36 for a purpose which is discussed more fully below.

As best shown in FIG. 2, the rack is supported on the seat 10 by resting the one side of the support surface 28 on a front 18 of the lower seat 16, and positioning the second leg 40 to extend downwardly into the crevice 22 and abut the seat back 20. The second leg then supports the support surface 26 on a generally horizontal plane.

Because vehicle seats have different slopes from front to back, the rack 10 is reversible and may be supported in the crevice 22 by either the first leg 36 or second leg 40. Thus, it is desirable to have legs of different lengths to accommodate seats having different crevice depths.

In the preferred embodiment, the first leg has a length of approximately two inches while the second leg has a predetermined length of approximately four inches. Thus, when the rack is positioned for use, a determination of the depth of the crevice is made and the rack is positioned with either the first or second leg extending downwardly into the crevice. The leg is selected which positions the support surfaces most closely on a horizontal plane to support the object being transported on a generally horizontal plane.

If, for example, as shown in FIG. 2, the second leg 40 is positioned in the crevice 22 of the seat, the first leg 36 will extend upwardly in a direction opposite from the second leg 40. The first leg 36 then acts to prevent the object from sliding forward off the platform in the event of a sudden stop. Conversely, the first leg may be positioned in the crevice 22 and the second leg may extend upwardly.

The rack 10 may be formed of any suitable rigid material, such as metal or plastic. In the preferred embodiment, the rack is molded in a unitary process of plastic. Likewise, the rack 10 can be formed of sheet metal and stamped to size and shape.

Figure 1:
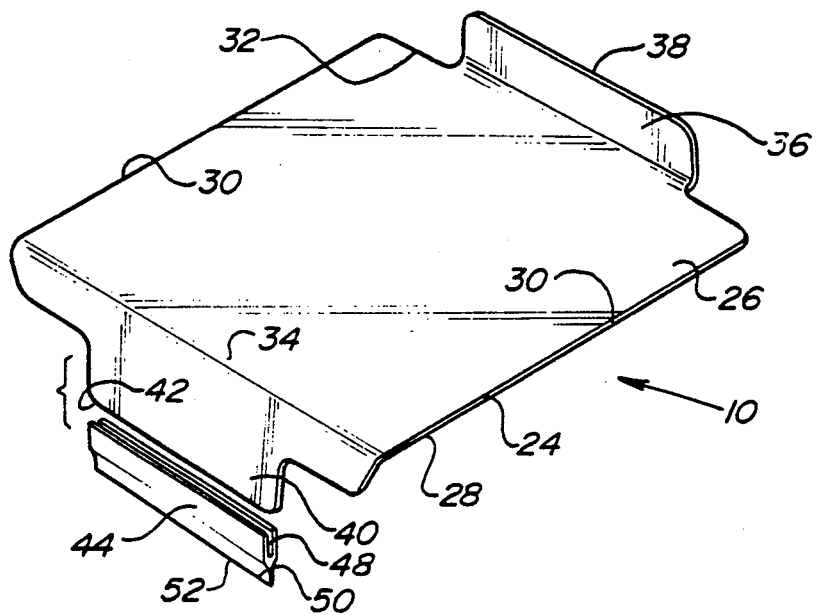
FIG. 1 is a perspective view of a rack and an extension member, shown in accordance with the invention.
Figure 3:
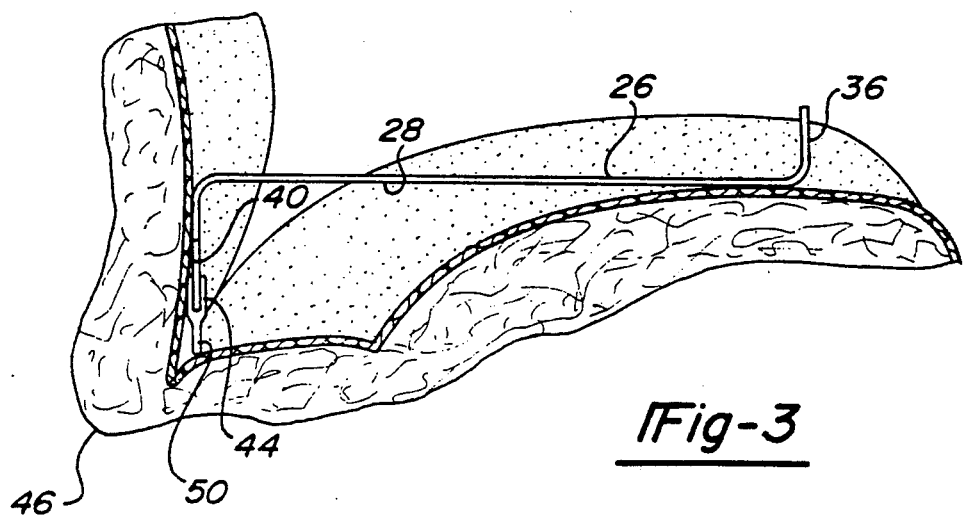
FIG. 3 is a cross-sectional side view of the rack and extension member shown in position on the seat of a vehicle.

As best shown in FIG. 3, an extension member 44 may be provided for a seat 46 which has exceptionally deep crevices. As shown in FIG. 1, the extension member 44 has a longitudinal groove 48 formed on one edge. The groove is dimensioned to accept the free end of either the first or second leg. The extension member 44 has a spacer portion 50 extending from the groove 48 to a longitudinal edge 52. The spacer portion extends the length of the leg such that the support surface may be positioned on a horizontal plane as shown in FIG. 3. Likewise, it would be a contemplation of the invention to have several extension members of differing spacer widths so that the full spectrum of crevice depths could be accommodated and the support surface easily positioned on a horizontal plane.

Thus, it will be appreciated that many variations of the invention may be made without departing from the scope and concept of the invention.

I claim:

1. A rack for supporting objects on a seat of a vehicle, said rack comprising:
   a platform having a pair of opposed support surfaces extending between a first side and a second side;
   a first leg having a first predetermined length extending from one of said pair of surfaces adjacent said first side;
   a second leg having a second predetermined length, said second leg extending from another of said pair of surfaces adjacent said second side whereby said platform is adapted to be supported on said seat by one of said first and second legs; and
   an extension member having a groove for accepting a free end of one of said first and second legs, said extensions member being adapted to extend between said one of said first and second legs to said seat to position said platform on a generally horizontal plane.

2. The rack as claimed in claim 1, wherein said first predetermined length of said first leg is twice said second predetermined length of said second leg.

3. The rack as claimed in claim 1, wherein said first leg extends in a direction normal to said one of said support surface.

4. The rack as claimed in claim 1, wherein said second leg extends on a plane normal to a plane extending parallel to said support surfaces.

5. The rack as claimed in claim 1, wherein the rack is reversible for use on seats of different vehicles.

6. The rack as claimed in claim 1, wherein the rack is formed in a unitary construction.

7. A rack for supporting objects on a seat of a vehicle, said rack comprising:
   a platform having a pair of opposed support surfaces extending between a first side and a second side;
   a first leg having a first predetermined length extending from one of said pair of surfaces adjacent said first side; and
   a second leg having a second predetermined length, said second leg extending from another of said pair of surfaces adjacent said second side whereby said platform is adapted to be supported on said seat by one of said first and second legs wherein said platform is adapted extends along said seat in a generally horizontal plane, said rack being reversible for use on seats of different vehicles.

8. The rack as claimed in claim 7 further comprising an extensions member having a groove for accepting a free end of one of said first and second legs, said extension member being adopted to extend between said one of said first and second legs to said seat to position said platform on a generally horizontal plane.

9. The rack as claimed in claim 7, wherein said first predetermined length of said first leg is twice said second predetermined length of said second leg.

10. The rack as claimed in claim 7, wherein said first leg extends in a direction normal to said one of said pair of support surfaces.

11. The rack as claimed in claim 7, wherein said second leg extends on a plane normal to a plane extending parallel to said support surfaces.

12. The rack as claimed in claim 7, wherein the rack is formed in a unitary construction.

* * * * *

UNITED STATES PATENT AND TRADEMARK OFFICE
CERTIFICATE OF CORRECTION

PATENT NO. : 5,253,791
DATED : October 19, 1993
INVENTOR(S) : John A. Chiodo

It is certified that error appears in the above-identified patent and that said Letters Patent is hereby corrected as shown below:

Column 4, Claim 1, line 11, delete "extensions" and insert

--extension--;

Column 4, Claim 3, line 19, after "said", 2nd occur--insert--pair of--;

Column 4, Claim 3, line 20, delete "surface" and insert

--surfaces--;

Column 4, Claim 7, line 40, delete "extends" and insert

--to extend--;

Column 4, Claim 8, line 44, delete "extensions" and insert

--extension--;

Column 4, Claim 8, line 46, delete "adopted" and insert

--adapted--

Signed and Sealed this

Seventh Day of June, 1994

Attest:

BRUCE LEHMAN

Attesting Officer          Commissioner of Patents and Trademarks